United States Patent
Chen et al.

(10) Patent No.: US 7,446,517 B2
(45) Date of Patent: Nov. 4, 2008

(54) POWER SUPPLY CONTROLLER AND METHOD THEREFOR

(75) Inventors: Gang Chen, Taipo (HK); Lung Wai Chris Chan, Shatin (HK); Chi Tak Leung, Shatin (HK)

(73) Assignee: Semiconductor Components Industries L.L.C., Phoenix, AZ (US)

( * ) Notice: Subject to any disclaimer, the term of this patent is extended or adjusted under 35 U.S.C. 154(b) by 185 days.

(21) Appl. No.: 11/339,110

(22) Filed: Jan. 26, 2006

(65) Prior Publication Data

US 2007/0170902 A1 Jul. 26, 2007

(51) Int. Cl.
G05F 1/00 (2006.01)
G05F 1/613 (2006.01)

(52) U.S. Cl. .................. 323/284; 323/225; 323/283

(58) Field of Classification Search ................. 323/222, 323/282–286, 288, 225; 363/41
See application file for complete search history.

(56) References Cited

U.S. PATENT DOCUMENTS

| | | | | |
|---|---|---|---|---|
| 5,723,963 A | * | 3/1998 | Li et al. ............... | 318/590 |
| 6,157,182 A | * | 12/2000 | Tanaka et al. ............... | 323/284 |
| 6,396,252 B1 | * | 5/2002 | Culpepper et al. .......... | 323/285 |
| 6,664,775 B1 | * | 12/2003 | Clark et al. .................. | 323/351 |
| 6,696,825 B2 | * | 2/2004 | Harris et al. ................. | 323/282 |
| 6,972,970 B2 | * | 12/2005 | Yamada ................... | 363/21.16 |
| 7,030,596 B1 | * | 4/2006 | Salerno et al. .............. | 323/282 |
| 7,239,119 B2 | * | 7/2007 | Bäurle et al. ................ | 323/284 |
| 2002/0125869 A1 | * | 9/2002 | Groom et al. ............... | 323/283 |

OTHER PUBLICATIONS

Maxim "Ultra-High Efficiency, Dual Step-Down Controller for Notebook Computers", MAX1715, 19-1541; Rev 2; Aug. 2005, copyright 2005 Maxim Integrated Products, 25 pps.
Maxim "Dual, High-Efficiency, Step-Down Controller with Accurate Current Limit", MAX1845, 19-1955, Rev 2; Jan. 2003, copyright 2003 Maxim Integrated Products, 27 pps.
Intrsil ISL6227 Data Sheet, "Dual Mobile-Friendly PWM Controller with DDR Option", Mar. 2004, FN9094.1, 26 pps.

* cited by examiner

Primary Examiner—Jessica Han
Assistant Examiner—Emily Pham
(74) Attorney, Agent, or Firm—Robert F. Hightower

(57) ABSTRACT

In one embodiment, a power supply controller uses a first clock of a first frequency to initiate a PWM cycle in a first operating mode and uses a second clock having a higher frequency to initiate a PWM cycle in a second operating mode.

17 Claims, 3 Drawing Sheets

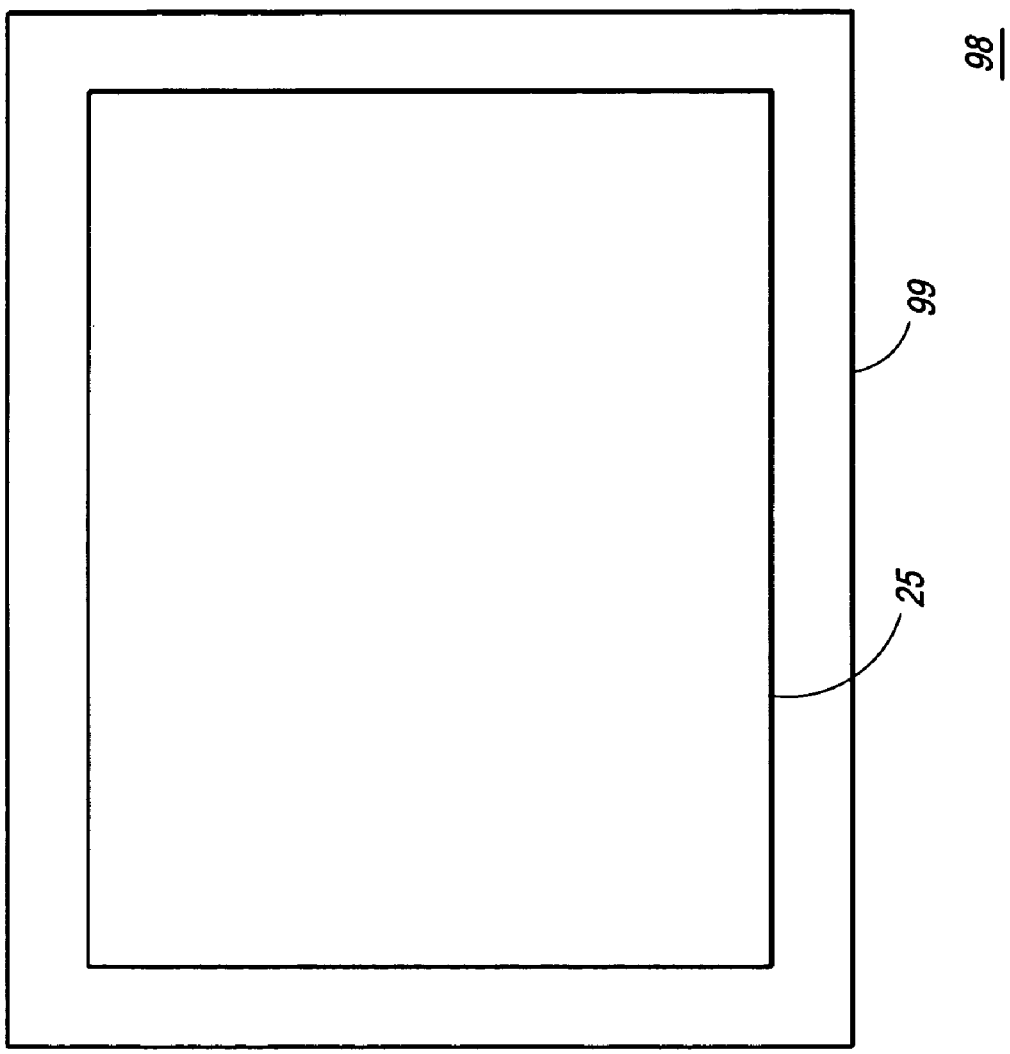

US 7,446,517 B2

POWER SUPPLY CONTROLLER AND METHOD THEREFOR

BACKGROUND OF THE INVENTION

The present invention relates, in general, to electronics, and more particularly, to methods of forming semiconductor devices and structure.

In the past, the semiconductor industry utilized various methods and structures to form switching power supply controllers, such as pulse width modulated (PWM) power supply controllers, that were used to regulate the value of a voltage supplied by a power supply system. In some cases, the switching power supply controllers were capable of operating in a fixed frequency mode during normal operation. When the current required by the load that was receiving power from the power supply system decreased, some of the prior switching power supply controllers operated in a light load mode that skipped some of the PWM cycles. In most cases, the cycle skipping operation was inefficient and also could produce undesirable electromagnetic interference. Additionally, the skip-cycle mode often resulted in high ripple in the output voltage. Some other PWM controllers operated in a hysteretic mode. The hysteretic operation was asynchronous and was difficult to use in multi-channel PWM controllers. Some other controllers operated in a constant on-time mode. These controllers were also asynchronous which could result in frequency beating problems between channels of a multichannel system.

Accordingly, it is desirable to have a power supply controller that operates under light load conditions with improved efficiency and reduces the amount of electromagnetic inference.

BRIEF DESCRIPTION OF THE DRAWINGS

FIG. 3 schematically illustrates an enlarged plan view of a semiconductor device that includes the power supply controller of FIG. 1 in accordance with the present invention.

For simplicity and clarity of the illustration, elements in the figures are not necessarily to scale, and the same reference numbers in different figures denote the same elements. Additionally, descriptions and details of well-known steps and elements are omitted for simplicity of the description. As used herein current carrying electrode means an element of a device that carries current through the device such as a source or a drain of an MOS transistor or an emitter or a collector of a bipolar transistor or a cathode or anode of a diode, and a control electrode means an element of the device that controls current through the device such as a gate of an MOS transistor or a base of a bipolar transistor. Although the devices are explained herein as certain N-channel or P-Channel devices, a person of ordinary skill in the art will appreciate that complementary devices are also possible in accordance with the present invention. It will be appreciated by those skilled in the art that the words during, while, and when as used herein are not exact terms that mean an action takes place instantly upon an initiating action but that there may be some small but reasonable delay, such as a propagation delay, between the reaction that is initiated by the initial action.

DETAILED DESCRIPTION OF THE DRAWINGS

Figure 1:
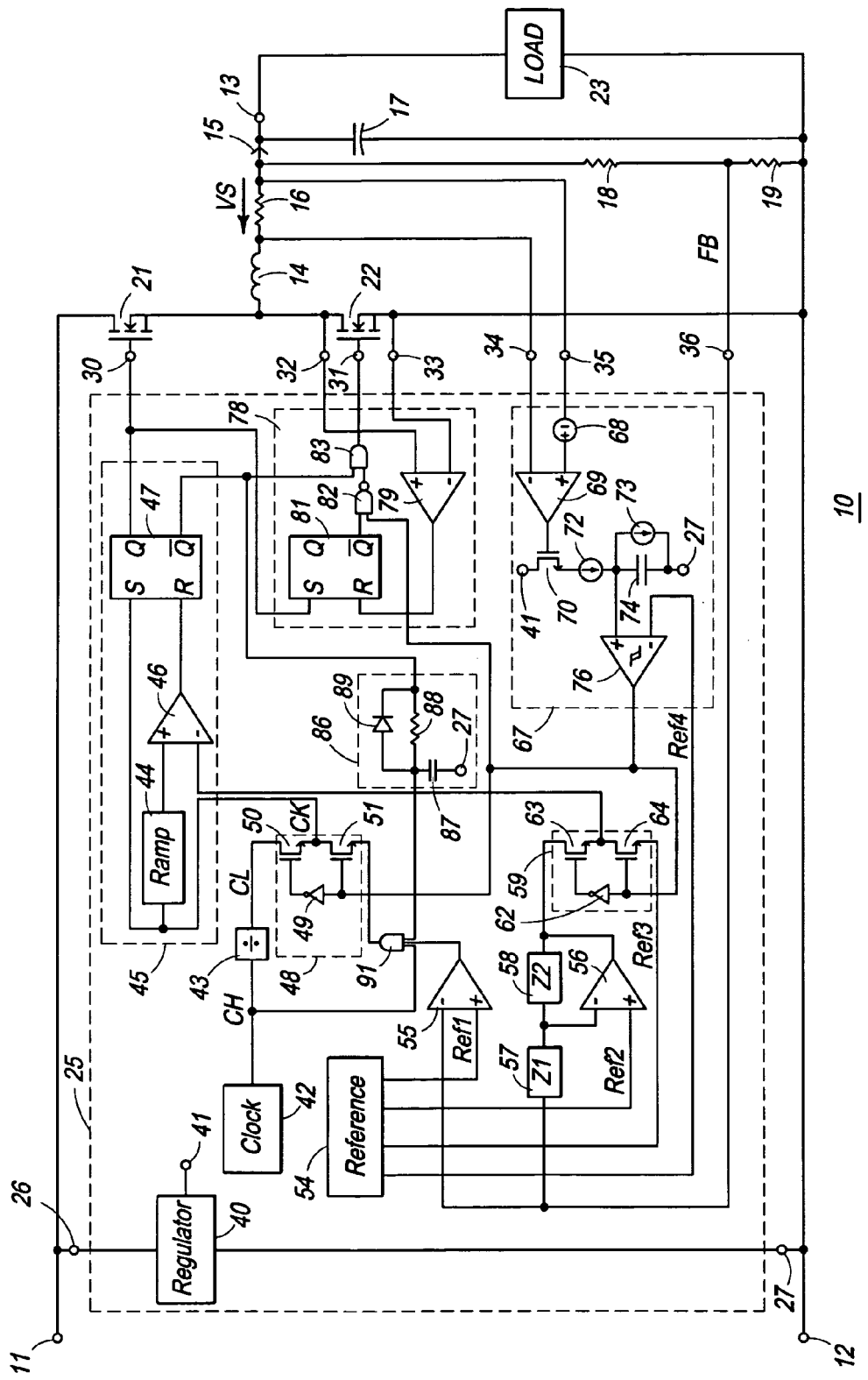
FIG. 1 schematically illustrates an embodiment of a portion of a power supply control system that includes an exemplary embodiment of a portion of a power supply controller in accordance with the present invention.

FIG. 1 schematically illustrates an embodiment of a portion of a power supply control system 10 that includes an exemplary form of a portion of a switching power supply controller 25. Controller 25 is configured to operate system 10 as a fixed frequency PWM power supply controller during a normal operating mode and to use a higher frequency clock to initiate successive PWM cycles during a light load (LL) operating mode. System 10 is connected receive power from an external power source, not shown, between a power input terminal 11 and a power return terminal 12, and to regulate an output voltage between an output 13 and terminal 12. The output voltage is regulated to a target value within a desired range of values around the target value. For example, the target value may be five volts (5V) and the desired range of values may be plus or minus five percent (5%) around the five volts. In addition to controller 25, system 10 generally includes a first power switch implemented as a first power transistor 21, a second power switch implemented as a second power transistor 22, an energy storage inductor 14, a current sense resistor 16, and an energy storage capacitor or filter capacitor 17. A feedback network that forms a feedback (FB) signal that is representative of the value of the output voltage is formed at a common node between resistors 18 and 19. Resistors 18 and 19 are connected in series between output 13 and terminal 12. Controller 25 receives the FB signal on a FB input 36. A current 15 flowing through inductor 14 to load 23 forms a current sense signal VS across resistor 16. In order to detect the value of current 15, a first current sense input 34 of controller 25 is connected to one terminal of resistor 16 and a second current sense input 35 of controller 25 is connected to a second terminal of resistor 16. Although transistors 21 and 22 are illustrated as being external to controller 25, in some embodiments transistors 21 and 22 may be internal to controller 25. Those skilled in the art will appreciate that the FB signal and the current sense signal may be derived by any of a variety of techniques that are well-know to those skilled in the art.

Controller 25 generally receives an input voltage from a voltage source external to controller 25 between a voltage input 26 and a voltage return 27. Return 27 typically is connected to terminal 12 and input 26 typically is connected to terminal 11. Controller 25 forms a first PWM drive signal to control transistor 21 on an output 30 and forms a second PWM drive signal to control transistor 22 on an output 31. Controller 25 also generally includes a fixed frequency clock 42, a clock divider 43, a ramp generator or ramp 44, a PWM comparator 46, a PWM latch 47, a reference voltage generator or reference 54, a clock multiplexer or clock Mux 48, a reference multiplexer or reference Mux 59, a comparator 55, an error amplifier 56, a mode control circuit 67, a zero crossing detection circuit 78, and a minimum off-time generator 86. Ramp 44, comparator 46, and latch 47 are a part of a PWM control block 45 of controller 25. Reference 54 generates reference voltages Ref1, Ref2, Ref3, and Ref4 that are used by various elements of controller 25. Divider 43 divides a high frequency clock (CH) generated by clock 42 to a lower frequency clock (CL). Mux 48 is a digital multiplexer and may include an inverter 49 and transistors 50 and 51. Mux 59 generally is an analog multiplexer and may include an inverter 62 and transistors 63 and 64. Error amplifier 56 generally includes impedances 57 and 58 that assist in providing a stable frequency response for controller 25. In most cases, controller 25 also includes an internal regulator 40 that is used to generate an internal operating voltage on an output 41. The internal operating voltage generally is used for operating elements of controller 25 such as clock 42, reference 54, ramp 44, comparators 46 and 55, error amplifier 56, and PWM latch 47 in addition to other elements of controller 25. Mode control circuit 67 is used to switch controller 25 to operate in either a normal mode or a light load (LL) mode. A low from circuit 67 causes controller 25 to operate in the normal mode and a high from circuit 67 causes controller 25 to operate in the light load (LL) mode. The exemplary embodiment of mode control circuit 67 that is illustrated includes a comparator 69, a transistor 70, an offset 68, current sources 72 and 73, a capacitor 74 and a comparator 76. Zero crossing detection circuit 78 is utilized to determine when a discharge current from inductor 14 through transistor 22 reaches a value that is approximately no greater than zero. For the exemplary embodiment of circuit 78 that is illustrated in FIG. 1, circuit 78 monitors the voltage across transistor 22 to detect the approximate zero crossing of the discharge current from inductor 14 through transistor 22. For this exemplary embodiment, circuit 78 includes a comparator 79 that is connected across transistor 22 and has a non-inverting input connected to a drain of transistor 22 through an input 32 of controller 25 and an inverting input connected to the source of transistor 22 through an input 33 of controller 25. Circuit 78 also includes a latch 81, a NAND gate 82, and an AND gate 83.

Figure 2:
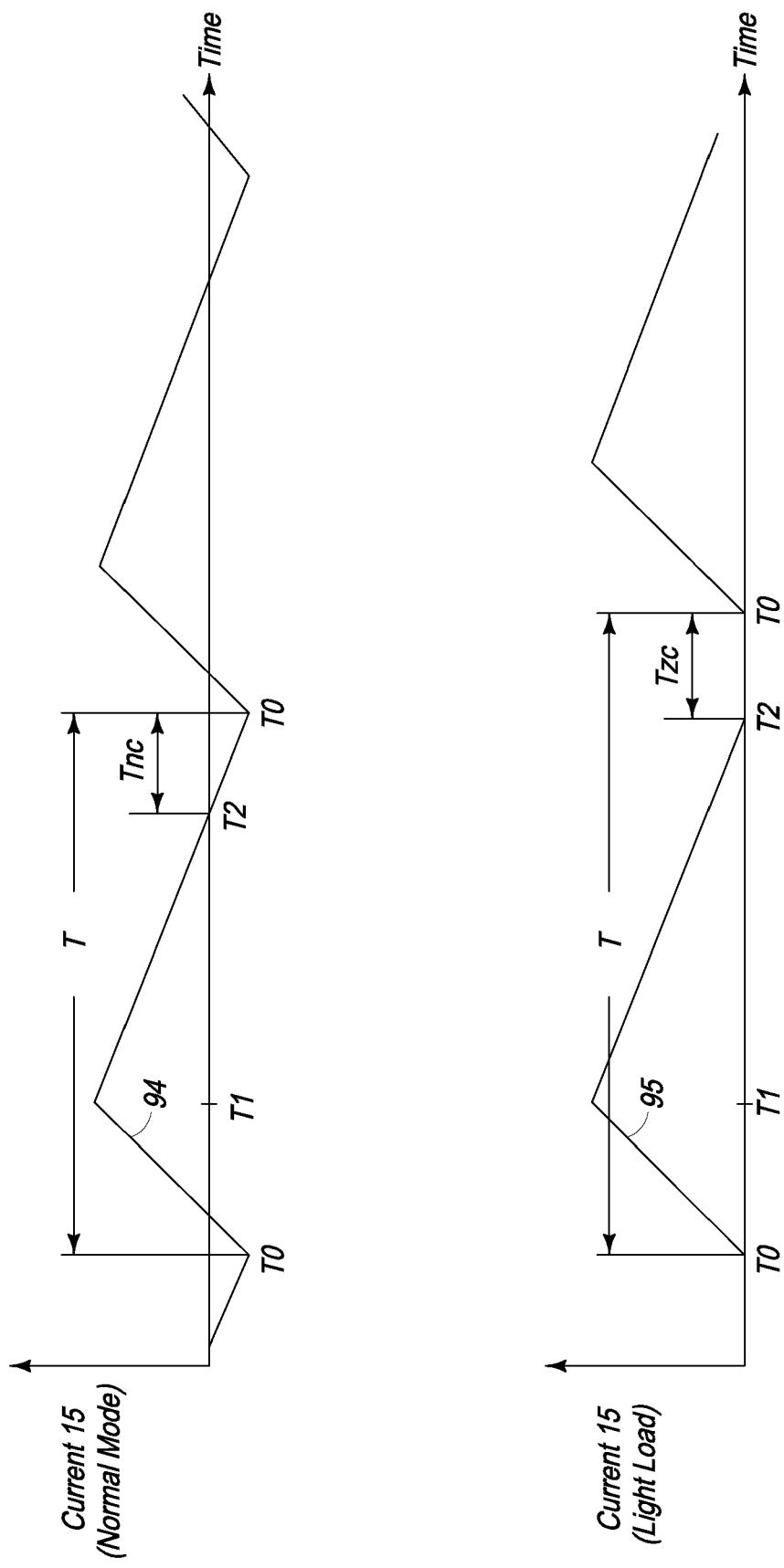
FIG. 2 is a graph having plots that illustrate some signals of the power supply control system of FIG. 1 in accordance with the present invention.

FIG. 2 is a graph having plots that illustrate some of the signals of system 10. A plot 94 illustrates one possible waveform of current 15 through inductor 14 during the normal mode and a plot 95 illustrates one possible waveform of current 15 through inductor 14 during the light load (LL) mode. The abscissa indicates time and the ordinate indicates increasing value of the signal of the illustrated signal. The letter "T" indicates the period of a PWM cycle for plots 94 and 95 including an on-time or active time and an off-time or inactive time of the PWM cycle and a corresponding state of transistor 21. A symbol Tnc represents a time during the inactive portion of the period during which the discharge current through transistor 22 is negative and a symbol Tzc represents a time during the inactive portion of the period during which transistor 22 is disabled and no discharge current is flowing through transistor 22. This description has references to FIG. 1 and FIG. 2.

Controller 25 has two operating modes that are controlled by the output of circuit 67. In the normal mode, controller 25 operates as a fixed frequency PWM controller. In this mode, current 15 supplied by inductor 14 to load 23 forms a positive VS signal across resistor 16. The positive VS signal forces the output of comparator 69 low. The low from comparator 69 disables transistor 70 and allows current source 73 to discharge capacitor 74 thereby forcing the output of comparator 76 low. The low from comparator 76 enables Mux 48 to select the low frequency clock (CL) from the output of divider 43 as the system clock (CK) for operating ramp 44 and PWM latch 47. In this mode, the frequency of CL sets the PWM cycle time and period. The low from comparator 76 disables transistor 51 and enables transistor 50 through inverter 49 to select CL instead of CH. The low from comparator 76 also enables Mux 59 to select the output of amplifier 56 to comparator 46. The output of amplifier 56 is selected because the low from comparator 76 also disables transistor 64 and enables transistor 63 through inverter 62. The low from comparator 76 also forces the output of gate 82 high and prevents latch 81 from affecting the operation of transistor 22. As a result, transistor 22 is controlled by PWM latch 47. In the normal mode CL, and correspondingly CK, go high which initiates a ramp signal from ramp 44 and also sets latch 47. The high from the Q output of latch 47 enables transistor 21 and the low from the Q bar output of latch 47 disables transistor 22 thereby coupling inductor 14 to receive current from terminal 11. This is illustrated at a time T0 in plot 94. When the value of the FB signal causes the output of amplifier 56 to cross the output of ramp 44, the output of comparator 46 goes high to reset latch 47. The low from the Q output disables transistor 21 and the high from the Q bar output enables transistor 22 to begin discharging inductor 14 as illustrated at a time T1 in plot 94. Latch 81 has no effect since the output of comparator 76 is low. Consequently, even if comparator 79 detects that the discharge current through transistor 22 reaches zero or even reverses direction, transistor 22 remains enabled. This is illustrated after a time T2 in plot 94. Consequently, in the normal operating mode, low frequency clock CL sets the period (T) of a PWM cycle by setting latch 47 to begin the PWM cycle and also initiating the generation of a ramp signal from ramp 44.

If current 15 decreases during the operation of controller 25, it may be advantageous to operate controller 25 in the LL mode as explained hereinafter. Circuit 67 provides a mode control signal that causes the mode change. When controller 25 changes to the LL mode, Mux 48 selects the high-frequency clock (CH) to be used as system clock CK, and Mux 59 selects a fixed reference Ref3 to PWM comparator 46 instead of error amplifier 56. Using the fixed reference value instead of the error amplifier output facilitates controller 25 forming a fixed on-time or fixed active time for a PWM cycle, thus, a fixed on-time for transistor 21. Using high frequency clock CH to initiate the next system clock cycle decreases the amount of delay between successive system clock cycles compared to the amount of delay between successive system clock cycles if low frequency clock CL were used to initiate the next system clock cycle. This also reduces the amount of ripple in the output voltage. A clock control gate 91 and minimum off-time generator 86 assist in synchronizing system clock CK to operate from high frequency clock CH.

Additionally in the LL mode, if the value of the output voltage is within the desired range of values, controller 25 does not generate another PWM cycle. Comparator 55 detects if the output voltage is greater than the lower limit of the desired range of value by comparing FB to a reference signal Ref1 that is representative of the lower limit. If the output of comparator 55 is low, gate 91 is forced low to inhibit generating a PWM cycle. If FB is less than Ref1, the output of comparator 55 is high and gate 91 is enabled to allow the next CH signal to propagate through and initiate a PWM cycle.

Mode control circuit 67 uses an average value of current 15 to determine the point at which controller 25 switches to the LL mode. The average value is represented by a voltage stored on capacitor 74. As the value of current 15 decreases, the value of sense signal VS across resistor 16 also decreases. If the value of current 15 decreases and becomes close to enough to zero that the value of VS is smaller than the value of offset 68, the output of comparator 69 goes high and enables transistor 70. This value of VS is referred to as the LL value of VS. Offset 68 ensures that VS does not decrease all the way to zero. Enabling transistor 70 enables current source 72 to begin charging capacitor 74. If VS remains at or below the LL value for a sufficient period of time, source 72 charges capacitor 74 to a voltage that is greater than the reference voltage Ref4 and the output of comparator 76 goes high to change the operating mode of controller 25 to the LL operating mode. The ratio between the current provided by sources 72 and 73 and the value of Ref4 usually determine the amount of time VS must remain at the LL value in order for comparator 76 to go high. For example, if source 72 is four times greater than source 73 and Ref4 is large, then VS may have to remain at the LL value for approximately one fourth of the period of a PWM cycle (one fourth of the period of clock CL). As can be seen, if transistor 70 is only enabled for a small portion of a cycle, the voltage on capacitor 74 may increase but may remain less than Ref4 and the output of comparator 76 may remain low. In some cases, it may take a couple of PWM cycles before the voltage on capacitor 74 decreases to a value that is less than Ref4.

In operation, the high from comparator 76 is used to change controller 25 to operate in the LL mode. Mux 48 receives the high from comparator 76 which enables transistor 51 and disables transistor 50 through inverter 49 thereby deselecting CL from system clock CK. If controller 25 is in the inactive portion or the off-time portion of the PWM cycle, the Q bar output from latch 47 is high. The high has reverse biased diode 89 and charged capacitor 87 through resistor 88 thereby propagating a high to one input of gate 91. The next positive edge of CH generates a ramp signal and sets latch 47 to generate another PWM cycle. The high from the Q output of latch 47 enables transistor 21 to supply current 15 to inductor 14 and load 23 as illustrated at a time T0 of plot 95. Current 15 may cause comparator 79 to disable transistor 70. If current 15 has a short duration, the voltage on capacitor 74 remains high enough to keep the output of comparator 76 high and keep controller 25 in the LL mode. The low from the Q bar output of latch 47 ensures that transistor 22 is disabled. The low Q bar output is also received by generator 86 which forward biases diode 89 and immediately discharges capacitor 87 and blocks the next high CH from propagating through gate 91. This assists in ensuring that the on-time or active time of the PWM cycle has a fixed duration that is controlled by ramp 44 and Ref3. The high from comparator 76 enables Mux 59 to select Ref3 to replace the output of error amplifier 56 by enabling transistor 64 and disabling transistor 63 through inverter 62. When the output of ramp 44 crosses the value of Ref3, the output of comparator 46 goes high to reset latch 47 and begin the off-time or inactive portion of the PWM cycle. Resetting latch 47 disables transistor 21 and enables transistor 22 to begin discharging inductor 14 as illustrated at a time T1 of plot 95. The high from the Q bar output of latch 47 reverse biases diode 89 so that capacitor 87 must be charged through resistor 88 before the high affects gate 91. This keeps gate 91 blocking CH to prevent initiating another PWM cycle until transistor 22 is enabled for a minimum amount of time established by the time required to charge capacitor 87. Since gate 82 of circuit 78 is enabled by the high from comparator 76, the zero crossing of the discharge current through transistor 22 controls the on-time of transistor 22. When transistor 22 has discharged inductor 14 sufficiently for the discharge current through transistor 22 to be no greater than approximately zero, the voltage across transistor 22 reverses and the output of comparator 79 goes high to reset latch 81. The high Q bar output forces the output of gates 82 and 83 low to disable transistor 22 as illustrated at a time T2 of plot 95. Latch 81 remains reset until the next PWM cycles sets latch 47 which then sets latch 81. Controller 25 waits until the next rising edge of CH signal to generate another PWM cycle that follows a similar operational sequence.

If the value of the output voltage increases during the LL mode, for example because load 23 needs even less current, the value of the FB signal may also increase. If FB becomes greater than the value of Ref1, the output of comparator 55 goes low and prevents controller 25 from generating another PWM cycle until the value of the output voltage decreases.

If the value of the current required by load 23 increases, the VS signal across resistor 16 may stay greater than the LL value for a time that is sufficient for source 73 to discharge capacitor 74 to a value that is less than Ref4. This may occur in one PWM cycle or it may take several PWM cycles to sufficiently discharge capacitor 74. When capacitor 74 discharges to a value that is less than or equal to Ref4, the output of comparator 76 again goes low and switches controller 25 back to the normal operating mode.

Those skilled in the art will appreciate that the values of Ref1-Ref4 may be important. The value of Ref2 along with resistors 18 and 19 set the value of the output voltage. The value of Ref1 should be close to and preferably slightly lower than Ref2 to set the lower value of the desired operating range of the output voltage. The value of Ref3 is preferably set close to the anticipated average value of the output of amplifier 56 during the normal operating mode. Ref4 is generally set to a value that is approximately half way between the value of the voltage on output 41 of regulator 40 and return 27.

In one example embodiment, CH has a frequency of approximately four hundred (400) KHz and CL has a frequency of approximately one hundred (100) KHz, source 72 is approximately four times the value of source 73, Ref4 is approximately 2.5 volts, and current 15 is between one and ten (1-10) amperes in the normal operating mode. For a light load operating mode with current 15 of approximately 0.5 amperes, the frequency of the PWM cycle in the light load operating mode was approximately fifty (50) KHz.

To assist in providing this functionality for controller 25, regulator 40 is connected between input 26 and return 27. The output of clock 42 is connected to a first input of gate 91 and an input of divider 43. The output of divider 43 is connected to a drain of transistor 50. A source of transistor 50 is commonly connected to a drain of transistor 51, the input of ramp 44, and the set input of latch 47. An output of ramp 44 is connected to a non-inverting input of comparator 46. A gate of transistor 50 is connected to an output of inverter 49 which has an input commonly connected to a gate of transistor 51, a first input of gate 82, the output of comparator 76, the gate of transistor 64, and an input of inverter 62. A source of transistor 51 is connected to the output of gate 91. A second input of gate 91 is connected to the output of comparator 55. An inverting input of comparator 55 is connected to input 36 and an inverting input of amplifier 56 through impedance 57. A non-inverting input of comparator 55 is connected to receive Ref1 from reference 54. A non-inverting input of amplifier 56 is connected to receive Ref2 from reference 54. The output of amplifier 56 is commonly connected to the inverting input of amplifier 56 through impedance 58 and to a drain of transistor 63. A source of transistor 63 is connected to a drain of transistor 64 and an inverting input of comparator 46. A gate of transistor 63 is connected to an output of inverter 62. A source of transistor 64 is connected to receive Ref3 from reference 54. An inverting input of comparator 76 is connected to receive Ref4 from reference 54. A non-inverting input of comparator 76 is commonly connected to a first terminal of capacitor 74, and output of source 72, and an input of source 73. An output of source 73 is connected to a second terminal of capacitor 74 and to return 27. An input of source 72 is connected to the source of transistor 70. A drain of transistor 70 is connected to output 41 of regulator 40. A gate of transistor 70 is connected to the output of comparator 69. An inverting input of comparator 69 is connected to input 34. A non-inverting input of comparator 69 is connected to the positive terminal of offset 68 which has a negative terminal connected to input 35. The output of comparator 46 is connected to the reset input of latch 47. The Q output of latch 47 is connected to output 30 and to the set input of latch 81. The Q bar output of latch 47 is commonly connected to a first input of gate 83, a first terminal of resistor 88, and a cathode of diode 89. A second terminal of resistor 88 is commonly connected to a third input of gate 91, an anode of diode 89, and a first terminal of capacitor 87. A second terminal of capacitor 87 is connected to return 27. The Q bar output of latch 81 is connected to a second input of gate 82. The output of gate 82 is connected to a second input of gate 83 which has an output connected to output 31. The reset input of latch 81 is connected to the output of comparator 79. An inverting input of comparator 79 is connected to input 33 and a non-inverting input of comparator 79 is connected to input 32.

FIG. 3 schematically illustrates an enlarged plan view of a portion of an embodiment of a semiconductor device or integrated circuit 98 that is formed on a semiconductor die 99. Controller 25 is formed on die 99. Die 99 may also include other circuits that are not shown in FIG. 3 for simplicity of the drawing. Controller 25 and device or integrated circuit 98 are formed on die 99 by semiconductor manufacturing techniques that are well known to those skilled in the art.

In view of all of the above, it is evident that a novel device and method is disclosed. Included, among other features, is forming a power supply controller to use a first clock of a first frequency to initiate PWM cycles during a normal operating mode and to use a second clock of a higher frequency to initiate PWM cycles during another operating mode. The higher frequency clock reduces the amount of time needed to respond to changes in the output voltage. Also, using two clocks that are derived from the same clock generator facilitates synchronizing the start of a PWM cycle to the clock thereby making it easier to use the power supply controller in multi-channel PWM systems.

While the subject matter of the invention is described with specific preferred embodiments, it is evident that many alternatives and variations will be apparent to those skilled in the semiconductor arts. Additionally, the word "connected" is used throughout for clarity of the description, however, it is intended to have the same meaning as the word "coupled". Accordingly, "connected" should be interpreted as including either a direct connection or an indirect connection.

The invention claimed is:

1. A power supply controller comprising:
   a PWM control block configured to form a PWM drive signal to regulate an output voltage within a desired voltage range; and
   a first circuit configured to select a first clock having a first frequency to initiate an active portion of a first PWM drive signal during a normal operating mode of the power supply controller and to select a second clock having a second frequency that is greater than the first frequency to initiate an active portion of a second PWM drive signal during a second operating mode of the power supply controller wherein the second frequency is divided to form the first frequency.

2. The power supply controller of claim 1 wherein the first clock and the second clock have fixed frequencies.

3. The power supply controller of claim 1 wherein the PWM control block includes a PWM latch, a PWM comparator, and a ramp generator and wherein the second clock sets the PWM latch and initiates a ramp signal to initiate the active portion of the second PWM drive signal.

4. The power supply controller of claim 1 further including a second circuit that inhibits the second clock from initiating the active portion of the second PWM drive signal for a first time period after initiating an inactive portion of the second PWM drive signal.

5. The power supply controller of claim 1 wherein the PWM control block includes a PWM comparator and a ramp generator and wherein the power supply controller further includes a second circuit configured to couple a fixed reference voltage to the PWM comparator responsively to the second operating mode of the power supply controller.

6. The power supply controller of claim 1 further including a mode control circuit configured to receive a sense signal representative of a current through an energy storage inductor that is external to the power supply controller and form a mode control signal that causes the power supply controller to switch between the normal operating mode and the second operating mode responsively to a value of the sense signal.

7. The power supply controller of claim 6 wherein the mode control circuit forms an average value of the sense signal and forms the mode control signal responsively to the average value of the sense signal.

8. A power supply controller comprising:
   a PWM control block configured to form a PWM drive signal to regulate an output voltage within a desired voltage range; and
   a first circuit configured to select a first clock having a first frequency to initiate an active portion of a first PWM drive signal during a normal operating mode of the power supply controller and to select a second clock having a second frequency that is greater than the first frequency to initiate an active portion of a second PWM drive signal during a second operating mode of the power supply controller a second circuit that inhibits selecting the second clock during the active portion of the second PWM drive signal.

9. The power supply controller of claim 8 wherein the second frequency is divided to form the first frequency.

10. The power supply controller of claim 8 wherein the PWM control block includes a PWM latch and wherein the second circuit blocks the second clock from the first circuit while the PWM latch sets the active portion of the PWM drive signal.

11. A method of forming a power supply controller comprising:
    configuring the power supply controller to use a first clock having a first frequency to initiate a first PWM cycle during a normal operating mode of the power supply controller;
    configuring the power supply controller to use a second clock having a second frequency that is greater than the first frequency to initiate a second PWM cycle during a second operating mode of the power supply controller; and
    configuring the power supply controller to initiate an inactive portion of the second PWM cycle responsively to a comparison of a fixed reference signal to a ramp signal wherein the ramp signal is initiated by the second clock.

12. The method of claim 11 wherein configuring the power supply controller to use the second clock having the second frequency that is greater than the first frequency to initiate the second PWM cycle includes configuring the power supply controller to use the second clock to initiate the second PWM cycle that is successive to the first PWM cycle.

13. The method of claim 11 wherein configuring the power supply controller to use the second clock having the second frequency that is greater than the first frequency includes configuring the power supply controller to form the first clock and the second clock as fixed frequency clocks.

14. The method of claim 11 wherein configuring the power supply controller to use the second clock having the second frequency that is greater than the first frequency includes configuring the power supply controller to inhibit initiating the second PWM cycle during an active portion of the second PWM cycle.

15. The method of claim 14 wherein configuring the power supply controller to inhibit initiating the second PWM cycle during an active portion of the second PWM cycle includes configuring the power supply controller to inhibit the second clock from setting a PWM latch and from initiating the ramp signal during the active portion of the second PWM cycle.

16. The method of claim 11 further including configuring the power supply controller to use an average value of current through an energy storage inductor that is external to the power supply controller for switching the power supply controller between the normal operating mode and the second operating mode.

17. The method of claim 11 further including configuring the power supply controller to regulate an output voltage that is external to the power supply controller and to inhibit initiating the second PWM cycle responsively to the output voltage having a value that is greater than a minimum value of the output voltage.

* * * * *